May 7, 1929.  C. M. COWAN ET AL  1,712,468
BOTTLE HOLDER
Filed March 26, 1928   2 Sheets-Sheet 2
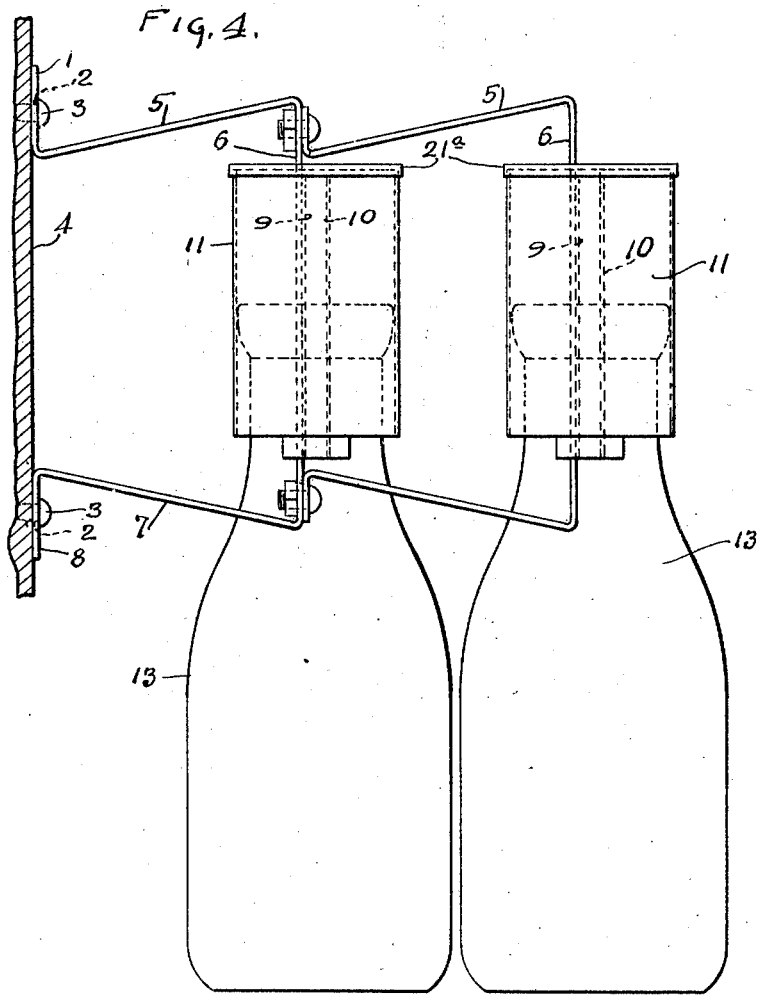
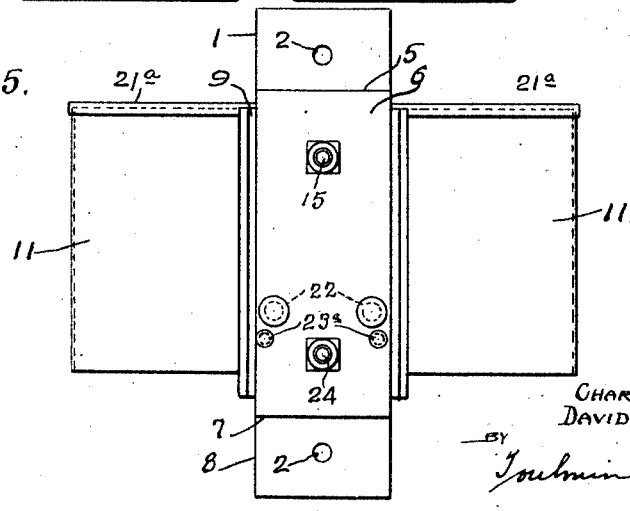

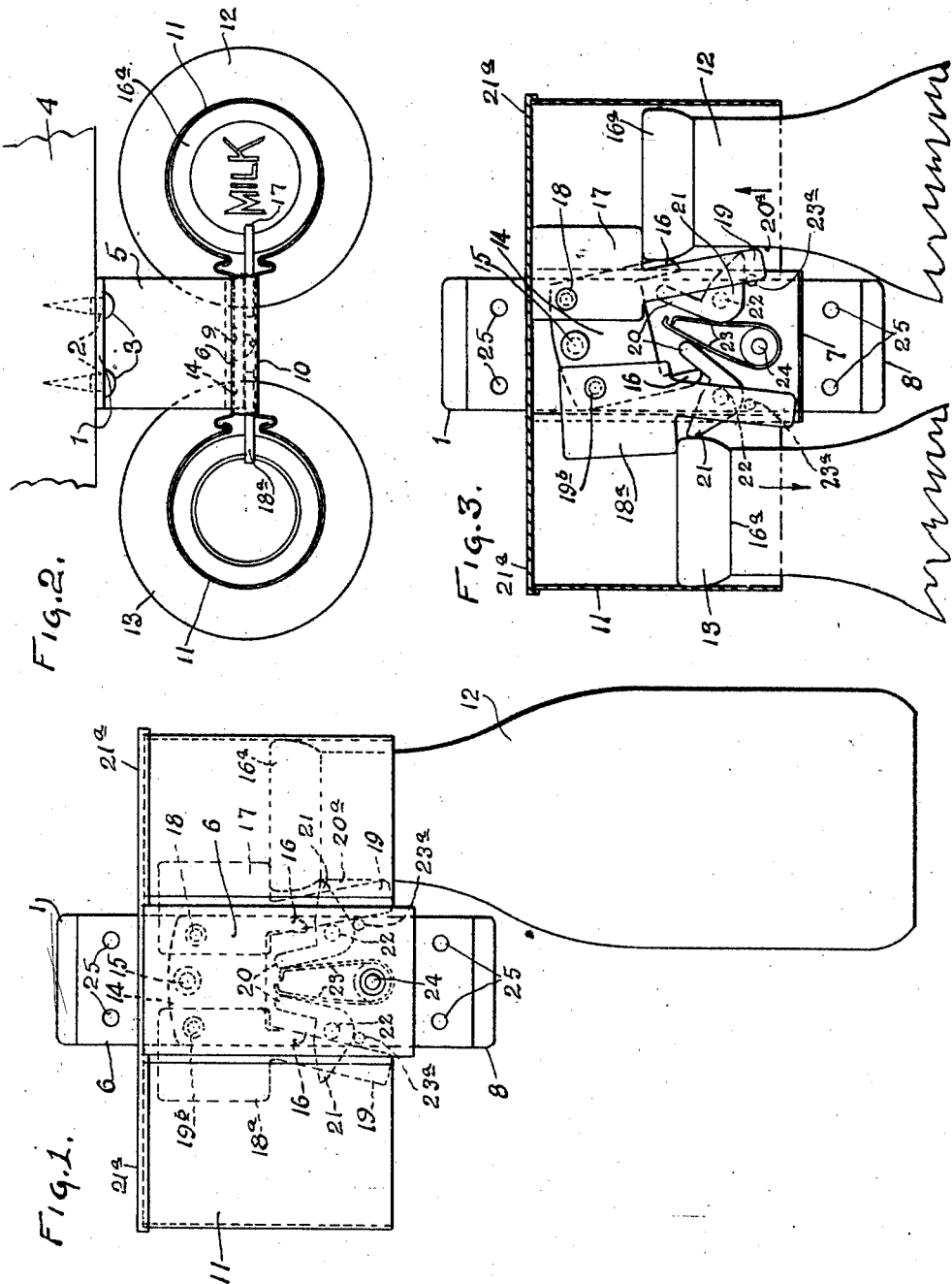

Patented May 7, 1929.

1,712,468

UNITED STATES PATENT OFFICE.

CHARLES M. COWAN AND DAVID S. MINNIEAR, OF SIDNEY, OHIO, ASSIGNORS TO THE MIAMI MANUFACTURING COMPANY, LIMITED, A COPARTNERSHIP DOING BUSINESS AT SIDNEY, OHIO, AND COMPOSED OF CHARLES M. COWAN, DAVID S. MINNIEAR, FRANK E. MILLER, AND WILLIAM LITTLEFIELD.

BOTTLE HOLDER.

Application filed March 26, 1928. Serial No. 264,737.

Our invention relates to bottle holders and in particular to a holder for milk bottles.

It is the object of our invention to provide a mechanism by which a bottle may be retained in locked position and cannot be detached until another companion bottle is inserted and locked into position, which serves to release the first bottle inserted in the holder. Consequently, it is impossible to get out of the holder a filled bottle, for instance, unless you return its companion empty bottle. This forces the householder to return the milk bottles to the company dispensing the milk effecting an enormous economy due to the loss of milk bottles. It also prevents unauthorized persons from stealing the bottles, prevents them from being turned over and broken and otherwise protects them.

Referring to the drawings:

Figure 1 is a front elevation of the holder of our invention with a bottle in locked position;

Figure 2 is a top plan view thereof;

Figure 3 is a section on the line 3—3 of Figure 2 showing the empty bottle on the right hand in the act of discharging the filled bottle on the left hand;

Figure 4 is a side elevation showing how a number of these locking units may be mounted one on the other to provide any number of them for a household of a given size;

Figure 5 is a rear elevation of the holder.

Referring to the drawings in detail, 1 indicates a vertical attaching plate having openings 2 for receiving screws 3 or other attaching means for mounting the bracket on the supporting wall 4. This plate 1 is extended forwardly as at 5, then vertically as at 6 and then inwardly as at 7 where it terminates in another plate like 1 designated 8.

This supporting bracket has mounted on its plate surface 6 the operative mechanism of the dispenser. Such mechanism is contained between the vertical plates 9 and 10 which have connected at their free ends the vertically-disposed tubular neck tubes 11 in which the necks of the bottles 12 and 13 are inserted. The walls 9 and 10 form the walls of this casing and the operating mechanism projects between these walls in the tubular space within the tubular members 11 in the path of the bottle mechanism.

Mounted upon this back wall 9 of the casing is a rocking plate 14 pivoted at 15. This plate is provided with a pair of spaced downwardly extending fingers 16 which engage with the outside of the lip of the bottle $16^a$. The upper edge of this lip of the bottle is engaged by a shoulder on an ejector plate 17 which is pivoted on the rocking plate 14 at 18. This ejector plate has a finger 19 which engages with the throat $20^a$ of the bottle, thereby limiting the extent of rotation of the ejector plate about this pivot 18 when the bottle is being thrust forwardly against the lower edge of the ejector plate. This ejector plate is further limited in its upward movement by the cap $21^a$ of the tubular member 11. The finger 16 engaging with the lip $16^a$ of the bottle due to the upward movement of the ejector plate acts as a further limiting factor, as the lip of the bottle is engaged beween this finger 16 and the inner wall of the tubular member 11.

On the other hand the outgoing bottle 13 is forced outwardly by the descent of the ejector plate $18^a$ pivoted at $19^b$ on the rocking plate 14.

The finger 16 acts as an unlocking finger by engaging with the arm 20 on the locking nuts 21 pivoted at 22 to the back frame 9. This lock is impelled into locking position by the spring 23 mounted at 24 on the back plate. Thus, the descent of the ejector plate, and the downward movement of the rocking plate 14 combines to not only eject the bottle but to unlock it. Upon the bottle being ejected the new bottle which is being inserted will become locked as it descends between the locking plate 17 and the locking nuts 21, which respectively engage the top and bottom of the lip $16^a$, the outer edge of the lip resting against the inner side of the tubular member 11. The lock is maintained in locking position by the spring 23. Thus, when you insert one bottle it cannot be withdrawn as it is locked until you insert another bottle which serves the dual purpose of unlocking the lock and ejecting the bottle. Pins 23ª prevent downward movement of the locks.

As it will be observed from Figure 4, it is possible to mount a series of these dispensers one on the other in any desired combination so that an adequate number of bottles may be installed at one time with a corresponding number of empties ejected.

In order to effect this, it will be noted that the vertical plate 6 is provided with spaced apertures at the top and bottom 25 to which similar plates are attached through their faces 1 and 8 and screws or bolts 3.

It will be understood that we desire to comprehend within our invention such modifications as may be necessary to adapt it to varying conditions and uses.

Having thus fully described our invention, what we claim as new and desire to secure by Letters Patent, is:—

1. In combination, a support having a pair of tubular bottle receiving portions, means projecting into each of said portions adapted to engage the top of bottles inserted therein, means projecting therein to engage with other portions of the bottle to lock the bottle therein so arranged that when one bottle is inserted it will be locked into position and simultaneously eject and unlock the bottle already therein.

2. In combination, a support having a pair of spaced tubular receiving bottle chambers substantially the size of the neck of a bottle having a lip thereon, means for limiting the upward movement of said bottle projecting into the respective tubular chambers, means for pivotally supporting said limiting means, means for pivotally supporting said support, locking means pivotally mounted adapted to project into said respective tubular chambers for engagement beneath the lip of the bottle, yielding means to maintain said locking means in locking position, said parts being so arranged that when one bottle is inserted in the tubular chamber this upward movement will be limited by the limiting means and the locking means will engage beneath the lip to lock it in position and simultaneously a bottle in the companion tubular member will be ejected by the descent of the limiting means, and means on the pivotal support therefor for unlocking the locking means for that bottle.

3. In combination, a supporting bracket, a pair of spaced tubular receiving members for receiving bottle necks, said bottles having lips thereon, a casing connecting said tubular members having the sides thereof open therein, ejector plates pivotally mounted on a rocking plate, said rocking plate being pivotally mounted within said casing and said ejector plates being adapted to project through the sides thereof into the tubular chambers for receiving the bottle necks, the lower edges of said ejector plates being adapted to engage with the upper edges of the lips of the bottles, pivotally mounted locking fingers adapted to engage the bottom of the lips of the bottles respectively projecting from said casing into said tubular chambers, means on said rocking plate for rocking said locking members, yielding means for resisting said rocking whereby when one bottle is inserted it elevates the ejector plate and tilts the rocking support therefor causing the companion rocking plate to descend to eject a bottle in the companion tubular chamber while said rocking plate withdraws said locking finger from said chamber to permit of the ejection of the bottle.

4. In combination, a bracket, a casing having open sides mounted thereon, tubular chambers communicating with said open-sided casing, means for closing the tops of said chambers, a rocking plate rocking within said casing, ejector plates pivotally mounted on either side thereof adapted to have their tops engage the covers for said tubular chambers and their bottoms engage the tops of bottles, unlocking fingers projecting downwardly from the edges of said rocking plate, angular locking members pivoted in said casing projecting into said tubular chambers having portions thereof adapted to engage with the fingers on the rocking plate, yielding means for maintaining said fingers in locking position interposed therebetween whereby when a bottle with a lip is projected into one chamber the upper edge of the bottle will engage the bottom of the ejector plate and force it upwardly until it engages the bottom of the top of the tubular chamber and the locking member will engage with the bottom of the lip of the bottle and a companion bottle in the companion chamber will be ejected by the descent of the ejector plate and the inward movement of the locking member by engagement with the finger on the rocking plate.

5. In combination in a milk bottle holder, a bracket support having a vertical face with spaced attaching apertures at the top and bottom thereof, and laterally projecting attaching flanges, said apertures in the face thereof being adapted for supporting a bracket of similar form by attachment of the attaching flanges thereto and spaced tubular bottle receiving chambers mounted between said apertures on the face of said plates with operating mechanism carried therebetween.

6. In combination, a supporting bracket, an operating mechanism casing with open sides mounted thereon, tubular chambers communicating therewith on either side thereof having closed tops and open bottoms, interconnected means projecting into said respective chambers consisting of means for limiting the upward movement of a bottle, means for locking said bottle so arranged that when one bottle is being limited in its upward movement and locked in position the other companion bottle in the companion chamber is being ejected by the upward movement limiting means while the locking means for that bottle is being withdrawn.

In testimony whereof, we affix our signatures.

CHARLES M. COWAN.
DAVID S. MINNIEAR.